(12) United States Patent
Kienzle et al.

(10) Patent No.: US 9,663,406 B2
(45) Date of Patent: May 30, 2017

(54) METHOD FOR SILICONIZING CARBON-CONTAINING MATERIALS

(75) Inventors: Andreas Kienzle, Balgheim (DE); Johann Daimer, Morfelden-Walldorf (DE); Rudi Back, Monchsdeggingen (DE); Otto Mederie, Meitingen (DE); Matthieu Schwartz, Augsburg (DE); Jens Rosenlocher, Augsburg (DE)

(73) Assignee: AUDI AG, Ingolstadt (DE)

( * ) Notice: Subject to any disclaimer, the term of this patent is extended or adjusted under 35 U.S.C. 154(b) by 815 days.

(21) Appl. No.: 12/544,649

(22) Filed: Aug. 20, 2009

(65) Prior Publication Data

US 2010/0043699 A1 Feb. 25, 2010

Related U.S. Application Data

(62) Division of application No. 11/712,401, filed on Mar. 1, 2007, now Pat. No. 7,763,224.

(30) Foreign Application Priority Data

Mar. 1, 2006 (DE) ........................ 10 2006 009 388

(51) Int. Cl.
  *B05C 13/02* (2006.01)
  *C04B 35/573* (2006.01)
  (Continued)

(52) U.S. Cl.
  CPC ............ *C04B 35/573* (2013.01); *C04B 35/64* (2013.01); *F27B 9/02* (2013.01); *F27B 9/04* (2013.01);
  (Continued)

(58) Field of Classification Search
  USPC .......................................................... 118/400
  See application file for complete search history.

(56) References Cited

U.S. PATENT DOCUMENTS 3,389,683 A * 6/1968 Gannoe ........................... 118/69
3,609,295 A * 9/1971 Bielefeldt ..................... 219/388
(Continued)

FOREIGN PATENT DOCUMENTS

| DE | 197 47 018 A1 | 4/1999 |
| DE | 600 16 818 T2 | 12/2005 |

(Continued)

*Primary Examiner* — Charles Capozzi
(74) *Attorney, Agent, or Firm* — Maier & Maier, PLLC

(57) ABSTRACT

A method for treating workpieces that consist of porous carbon material with liquid silicon with the formation of silicon carbide, comprising the steps: Preheating porous carbon workpieces under inert gas to the selected operating temperature $T_B1$, feeding liquid silicon to the porous carbon workpieces at an operating pressure $p_B2$ and an operating temperature $T_B2$, and impregnating the porous carbon workpieces with liquid silicon, reaction of the liquid silicon in the workpiece at a temperature $T_B3$ with the formation of silicon carbide that consists of carbon and silicon, gassing the workpiece with inert gas and cooling from the operating temperature $T_B3$ to the conditioning temperature $T_k$, cooling the workpieces to room temperature, the temperature $T_B3$ being greater than or equal to the temperature $T_B2$, and the workpiece in step d of the method no longer being in contact with liquid silicon outside of the workpiece.

9 Claims, 4 Drawing Sheets

(51) Int. Cl.
*C04B 35/64* (2006.01)
*F27B 9/02* (2006.01)
*F27B 9/04* (2006.01)
*F27B 9/20* (2006.01)
*F27B 9/36* (2006.01)

(52) U.S. Cl.
CPC .............. *F27B 9/20* (2013.01); *F27B 9/36* (2013.01); *C04B 2235/40* (2013.01); *C04B 2235/402* (2013.01); *C04B 2235/404* (2013.01); *C04B 2235/405* (2013.01); *C04B 2235/428* (2013.01); *C04B 2235/656* (2013.01); *C04B 2235/658* (2013.01); *C04B 2235/6581* (2013.01); *C04B 2235/662* (2013.01); *Y02P 40/65* (2015.11)

(56) References Cited

U.S. PATENT DOCUMENTS

| | | | | |
|---|---|---|---|---|
| 3,879,165 A * | 4/1975 | Kreider et al. | | 432/121 |
| 3,930,787 A * | 1/1976 | DeHollander et al. | | 432/198 |
| 4,481,235 A * | 11/1984 | Foell et al. | | 427/74 |
| 4,626,516 A * | 12/1986 | Morelock | | 501/92 |
| 4,807,853 A * | 2/1989 | Murakami et al. | | 266/81 |
| 4,861,416 A * | 8/1989 | Morrison | | 117/24 |
| 5,037,588 A * | 8/1991 | Farthing et al. | | 264/29.1 |
| 5,817,177 A * | 10/1998 | Wallace | | 118/69 |
| 6,035,925 A * | 3/2000 | Blucher | | 164/419 |
| 6,126,749 A | 10/2000 | Park et al. | | |
| 6,512,206 B1 * | 1/2003 | McEntire et al. | | 219/388 |
| 6,652,654 B1 * | 11/2003 | Propp et al. | | 118/718 |
| 2002/0020496 A1 * | 2/2002 | Shinohara et al. | | 156/345 |
| 2004/0089987 A1 * | 5/2004 | Kodama et al. | | 266/236 |
| 2004/0159285 A1 * | 8/2004 | Doehler et al. | | 118/718 |

FOREIGN PATENT DOCUMENTS

| | | | |
|---|---|---|---|
| EP | 0 453 592 A | 10/1991 | |
| EP | 0956276 A1 | 11/1999 | |
| EP | 1 607 704 A | 12/2002 | |
| EP | 1607704 A1 * | 12/2005 | ............... F27B 9/02 |
| JP | 06 048837 A | 2/1994 | |

* cited by examiner

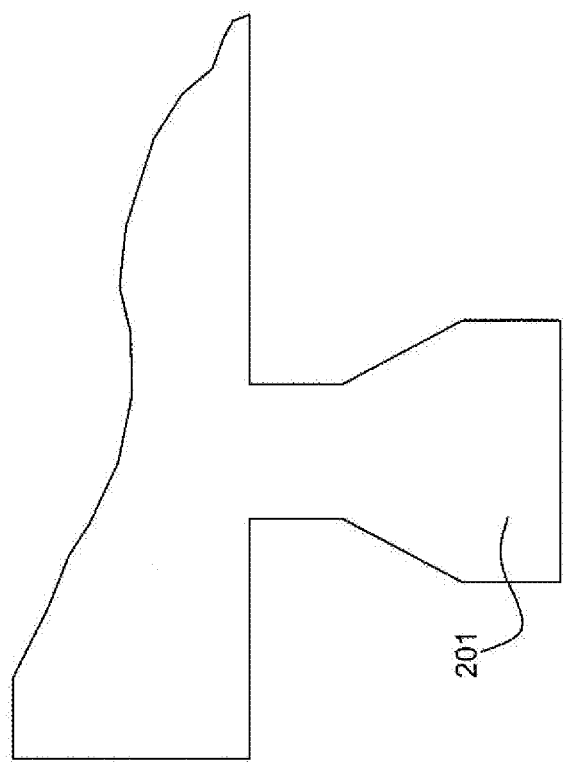

METHOD FOR SILICONIZING CARBON-CONTAINING MATERIALS

This is a Divisional application of U.S. patent application Ser. No. 11/712,401 filed on Mar. 1, 2007 now U.S. Pat. No. 7,763,224, which claims priority from German Application No. 102006009388.7, filed Mar. 1, 2006. The entire disclosure of U.S. patent application Ser. No. 11/712,401 is hereby incorporated by reference.

This invention relates to an apparatus for siliconizing carbon-containing materials.

BACKGROUND OF THE INVENTION

A method for siliconizing carbon materials was described by a working group of DLR (Deutsche Forschungsanstalt fur Luft- und Raumfahrt e.V. [German Research Institute for Air and Space Travel e.V.]), Stuttgart, Institut für Bauweisen- ünd Konstruktionsforschung [Institute for Construction and Design Research], in the VDI [Association of German Engineers] Materials Conference in Duisburg on Mar. 9-10, 1994. Carbon materials, reinforced with fibers that consist of carbon, were infiltrated therein with melted silicon in a so-called "liquid siliconization method," By heat treatment, the elementary silicon 'reacts with the carbon to form silicon carbide. Structural components and in particular friction elements for brake and clutch systems in automobiles can be produced from such materials.

Similar methods are described in, for example, EP 0 956 276, with the carbon workpieces that are to be siliconized and suitably bonded powdery silicon being heated together; the melted silicon penetrates the carbon workpieces and reacts at least partially with the carbon to form silicon carbide.

All known methods are, however, batch methods; in the past, only batch-type conversion of carbon materials into materials with a silicon carbide-containing matrix was possible. In this case, the furnaces in which the silicon is melted and in which the reaction of liquid silicon with carbon to form silicon carbide is performed must first be charged, heated up under inert gas atmosphere and optionally evacuated, cooled after the reaction to form silicon carbide at the necessary holding time, and unloaded. Such a method requires long heating and cooling times and is inefficient in terms of energy use.

The object is therefore to indicate a method with which a treatment, to be operated semi-continuously, of workpieces that optionally consist of fibers, preferably of carbon, reinforced porous carbon with liquid silicon with at least partial conversion to silicon carbide, is possible.

SUMMARY OF THE INVENTION

The object is achieved by a method that comprises the following steps:
a Preheating porous carbon workpieces under inert gas to the selected operating temperature $T_B1$,
c Feeding liquid silicon to the porous carbon workpieces at an operating pressure $p_B2$ and an operating temperature $T_B2$, and impregnating the porous carbon workpieces with liquid silicon,
d Reaction of the liquid silicon in the workpiece at a temperature $T_B3$ with the formation of silicon carbide that consists off carbon and silicon,
e Gassing the workpiece with inert gas and cooling from the operating temperature $T_B3$ to the conditioning temperature $T_k$
f Cooling the workpieces to room temperature, the temperature TB3 being greater than or equal to the temperature $T_B2$, and the workpiece in step d of the method no longer being in contact with liquid silicon outside of the workpiece.

In a preferred way, an additional step b Reduction of the pressure to the operating pressure $p_B1$ can be inserted between steps a and c, whereby the reduction of the pressure can be carried out before or after the heating or during the heating, but always after the step of rinsing with inert gas.

Another subject of this invention is an adapted device for implementing the method, consisting of at least four chambers 1 to 4, which are connected to one another by locks, whereby each of the chambers, independently of its neighbors, can be heated, cooled, evacuated and filled or rinsed with suitable gases. In this context, each of the chambers 1 is provided with at least one transporting or conveying device, with whose assistance the workpieces are transported from the previous chamber $O_{i-1}$ into the chamber $O_i$ and from the chamber $O_i$ into the subsequent chamber $O_{i+1}$, in the configuration with 4 chambers, for example, $O_{i=0}$ being the inlet and $O_{i=5}$ being the outlet from the configuration consisting of four chambers. In the ease of four chambers, the index i can assume the values 1, 2, 3 and 4. The inlet (first lock) and the outlet (last lock) are referred to here as O0 and 5 for simplification.

Spatial separation of the individual steps of the method and clocklike semi-continuous conveying of the workpieces in chambers that are separated from one another and from the environment by locks make it possible to allow the operating conditions (temperature, pressure) in the individual chambers to be as constant as possible; this results in uniform operating conditions, reduction of the energy demand, and greater flexibility in production. Conveying or transporting of the workpieces can be carried out by means and methods that are known in the art, for example by sliding or conveying by means of a slide, by transport on rollers, by means of one or more lifting bars, or on a plain coil chain. In this case, materials are used for the transport means that withstand the selected temperatures and the media that are used, for example selected from graphite and other carbon materials that can be reinforced with fibers, e.g., made of carbon, and also materials that consist of boron nitride or refractory materials that are coated with boron nitride.

In this context, steps a and b as well as steps d and e can be performed in each case in a common chamber, while at least one separate chamber is otherwise provided for each of the steps of the method.

The heating in the chambers is carried out with known heating devices, in particular infrared radiators, inductive heaters, microwave heaters and heating by heated gas (inert gas). Cooling is carried out by a cooled flow of gas flowing through the chamber in question, at higher temperatures, inert gases such as nitrogen and argon being preferred, while at temperatures of no more than 300° C., air can also be used.

BRIEF DESCRIPTION OF THE DRAWINGS

By preference an induction heater in the chamber 1 is used, since this type of heater can very quickly introduce large amounts of energy into the workpiece.

The device will be explained using the drawings.

FIG. 2c shows an enlarged section through a workpiece with a molded-on fitting 201.

DETAILED DESCRIPTION OF THE PREFERRED EMBODIMENTS OF THE INVENTION

Figure 1:
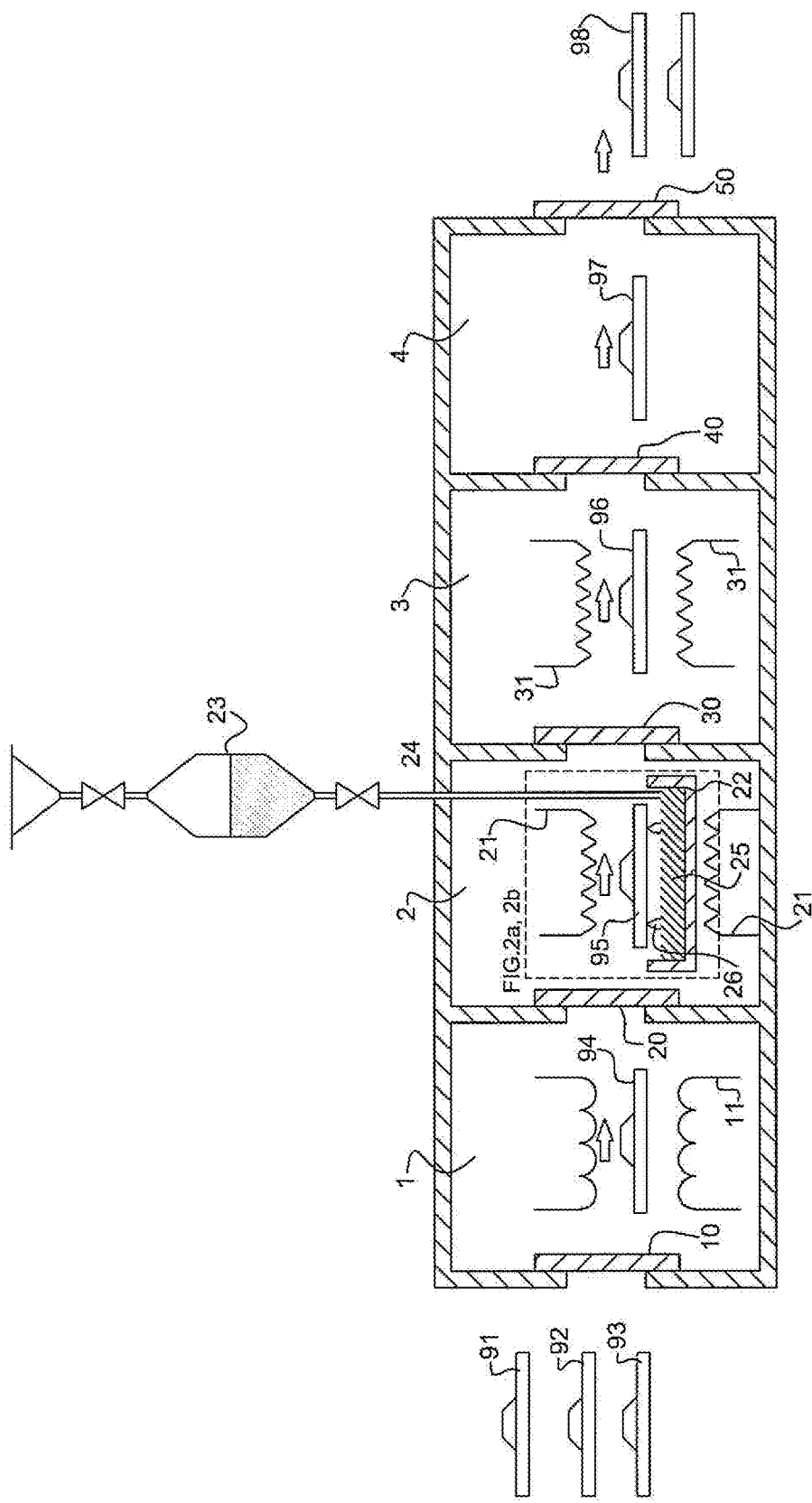
FIG. 1 shows a diagrammatic section through a configuration with four chambers; to improve the clarity, the feed and exhaust cycles are not indicated for the gases that are used.

According to the invention, the procedure is preferably carried out in a device, shown in FIG. 1, that consists of four chambers, so that the workpieces are inserted in succession into the first chamber 1 by the lock 10 from outside, here represented as the next to be inserted and referred to as 91, 92 and 93. After closing the lock 10, the chamber 1 is flushed according to step a of the method with a wave of inert gas by means of a system for flushing a gas through the chamber, preferably with nitrogen or argon, and after the displacement of the air by means of optionally several sequences of inert gas flushing and evacuation, the workpiece 94 that is already located in the chamber is preferably heated by an induction heater 11 from room temperature to the operating temperature $T_B1$, which can be from 1300° C. to 1800° C., preferably 1350° C. to 1750° C. In a preferred way, the operating pressure is reduced by 1 bar (outside pressure, $10^5$ Pa) to a value $p_B1$ of preferably no more than 100 mbar (100 hPa), especially preferably up to 50 hPa (50 mbar), and in particular no more than 20 mbar (20 hPa). This reduction of the pressure according to step b of the method can be carried out before heating, during heating or after heating.

At the latest before the lock 20 is opened, a negative pressure is produced in the chamber 01, as it also preferably constantly prevails in chamber 2, preferably below 10 hPa (10 mbar), in particular below 1 Pa ($10^{-2}$ mbar).

If this pressure is reached, the workpiece is transported by the lock 20 into the chamber 2, where it is now referred to as 95. After the lock 20 is closed, a new workpiece is inserted from outside by the lock 10 into the chamber 1 and heated as described above.

In the chamber 2, the workpiece 95 is taken up at an operating pressure $P_B2$ of no more than about $10^2$ mbar (1 Pa) and at an operating temperature $T_B2$ that can be adjusted via the heater 21 from 1450° C. to 1700° C. by a transport device, not shown, and placed on the supports (porous wicks) 26 that are mounted in the siliconizing device 27. In this siliconizing device 27, liquid silicon 25 that is located in a basin 22 according to step c of the method moves into the workpiece 95 that consists of carbon via the porous wicks 26. At the temperature prevailing in the chamber, of between 1450° C. and 1700° C., silicon penetrates into the pores of the workpiece 95 and reacts at least partially according to step d of the method with the carbon that is present in the workpiece to form silicon carbide. The workpiece is referred to as "siliconized workpiece" after this treatment.

Figure 2A:
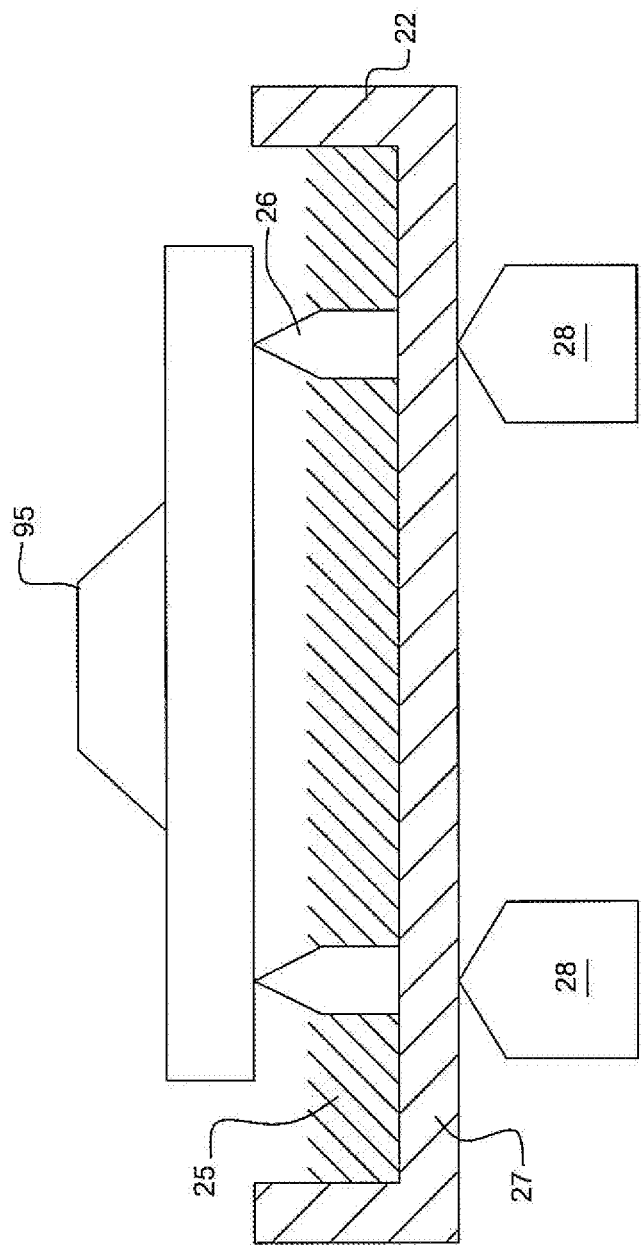
FIG. 2a shows a cutaway of the second chamber 2 according to FIG. 1, with the detailed representation of the positioning of the workpiece 95 on (two shown) preferably porous wicks 26, which guide the liquid silicon to the workpiece 95.

In a preferred embodiment, the basin 22 is placed in the chamber 2 on one or more (two in number shown in the drawing of FIG. 2a) pressure measuring cells 28; this makes it possible to determine the mass of the silicon taken up in the workpiece by weighing the basin before the attachment of the workpiece 95 and after the infiltration and the removal of the workpiece 95.

After the siliconization, the siliconized workpiece 95 is raised from the wicks and transported by the lock 30 into the chamber 3.

After each clock cycle (removal of a siliconized workpiece 95 from 2 and input of a freshly preheated workpiece from the chamber 1), the level of the liquid silicon in the basin 22 is made up again to the preset value; to this end, a reservoir 23 with liquid silicon, which is connected by a pipe 24 to the basin 22, is used.

In the chamber 03, optionally by further heating with the heater 31, the reaction is completed to the desired extent according to step d of the method in the siliconized workpiece, whereby the spatial separation of the chamber 2 produces the advantageous possibility of annealing the workpiece in the chamber 3 even at a temperature $T_B3$ above the temperature $T_B2$ without running the risk of silicon escaping from the basin 22 as in the selection of a higher temperature in the chamber 2 by the higher vapor pressure. It was noted namely in the tests upon which this invention was based that the silicon penetrates into the pores of the workpiece (now 96) has a considerably lower vapor pressure compared to the silicon in the bath 22 at the same temperature.

A preferred temperature range for such an after-reaction is that of 1500° C. to 2000° C., especially preferably 1600° C. to 1900° C., and in particular 1700° C. to 1800° C. The formation of the silicon carbide can proceed considerably faster, which results in a desirable shortening of the cycle times in the method according to the invention.

Heating in the chambers 2 and 3 is carried out preferably by a radiant heater, for example with graphite heating elements 21 and 31 that are brought to annealing by Joule heating.

As soon as the reaction to form silicon carbide is carried out to the desired extent, the workpiece is cooled in the chamber 3 by blowing in cold inert gas according to step e of the method, preferably to a conditioning temperature $T_K$ in the range of 500° C. to 300° C. The operating pressure $p_B3$ in this case increases from initially (after-reaction) below 1 mbar (1 hPa) to normal pressure ($10^5$ Pa 1 bar). Then, the workpiece 96 is brought through the lock 40 into the chamber 4 and further cooled to room temperature there in the position 97 according to step f of the method, first with inert gas, starting from temperatures of no more than 300° C., and also with air. The finished workpiece 98 can then be removed by the lock 50.

Of course, before the next workpiece 95 is conveyed into the chamber 3 for the after-reaction, this chamber 3 is again evacuated to the operating pressure $p_B3$.

In the method according to the invention, in an embodiment with four chambers, a dwell time of workpieces in the chambers 1 to 4 of three minutes up to twenty minutes in each case has proven advantageous.

The method according to the invention ensures that the workpieces 95 that are brought into the chamber 2 for siliconization are always brought to the operating temperature prevailing in 2 and that the operating pressure in 2 is always maintained. This uniformity of pressure and temperature in the siliconization step has proven essential for reaching a constant product quality. Another advantage is that the workpieces are not cooled in contact with the silicon bath, and this keeps pores that are formed during cooling by volume contraction of silicon from being filled by subsequently suctioned-off silicon.

If several steps of the method are performed in one of the chambers, for example in 3, the stage of the after-reaction, which optionally is carried out at an elevated temperature compared to 2, and then the cooling, it is further preferred to subdivide these chambers. In the case of 3, such a subdivision according to steps d and e of the method are provided, first to perform the after-reaction at the higher temperature and then to bring the workpiece in turn, through a lock in an additional chamber configured between 3 and 4 for cooling. In this way, it is achieved that the chamber 3 can be operated at a constant temperature, and the chambers configured between 3 and 4 are used only for cooling.

It is also possible to configure two chambers behind one another with the same step of the method if the necessary dwell time for a step of the method deviates considerably from that for the other steps in the method, in this way achieving a uniform clock cycle for all chambers. The minimum number of chambers necessary for the method is four.

Figure 2B:
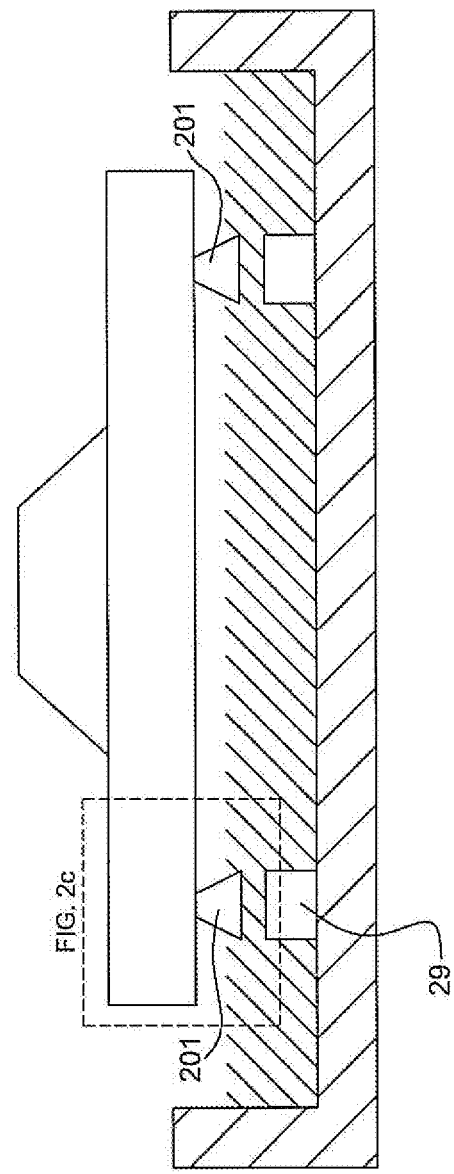
FIG. 2b shows a cutaway of the chamber 2 according to FIG. 2a, with the detailed representation of an alternative embodiment, the workpiece itself having a molded-on fitting 201.

In another embodiment, the workpieces 9 have molded-on fittings 201 on a flat side, these fittings 201 having a tapering section on this flat side as is shown in FIG. 2b and enlarged in FIG. 2c. These fittings 201 dip into the liquid silicon 25 in the silicon bath 27 or are on the supports 29. After the finished workpieces are removed from the device, these fittings 201 can easily be broken off, since the extent of the tapering section is selected to make this possible.

It is also possible, of course, to use alloys or liquid mixtures of silicon with one or more other elements for infiltration instead of pure silicon. In particular, additives of iron (in a percentage by mass of up to 6% in the mixture), refractory metals, such as chromium, molybdenum, tungsten, zirconium (in a percentage by mass of up to 3% in the mixture in each case) as well as manganese, aluminum, cobalt and nickel (in a percentage by mass of up to 3% in the mixture in each ease) have proven their value.

The invention claimed is:

1. An apparatus for forming a body of silicon carbide, comprising:
a housing providing a plurality of chambers each of which is constructed to receive a body of porous carbon, be sealed closed and discharge a received body, the housing configured to flush air from a first of said chambers upon receiving said body;
means for heating said body in said first chamber upon having flushed the air therefrom, at a first temperature and a first pressure;
a first lock between said first chamber and a second of said chambers configured to open once a predetermined negative pressure in said first chamber is reached, wherein the second chamber includes a siliconizing device having:
a basin of liquid silicon mounted on one or more pressure measuring cells, the basin connected to a reservoir of liquid silicon; and
one or more porous wicks mounted in the basin and configured to impregnate said body pretreated in said first chamber with molten silicon, in said second chamber, at a second temperature greater than said first temperature and a second pressure lower than said first pressure;
a second lock between said second chamber and a third of said chambers;
means for heating said body impregnated in said second chamber, in said third chamber, at a third temperature greater than said second temperature, to anneal said body;
a third lock between said third chamber and a fourth of said chambers;
means for cooling said body in said fourth chamber; and
means for transporting said body successively to and through said chambers and said locks.

2. An apparatus according to claim 1 wherein said air flushed from said first chamber includes an inert gas.

3. An apparatus according to claim 2 wherein said inert gas consists of one of nitrogen and argon.

4. An apparatus according to claim 1 wherein said first temperature is a temperature selected from temperatures in the range of 1300° to 1800° C. and said first pressure is a pressure selected from pressures in the range of 1 bar and 100 mbar.

5. An apparatus according to claim 1 wherein said second temperature is a temperature in the range 1450° to 1700° C. and said second pressure is no more than $10^{-2}$ mbar.

6. An apparatus according to claim 1 wherein said means for heating is selected from the group consisting of an induction heater, an infrared heater, a microwave heater and a supply of heated gas.

7. An apparatus according to claim 1 wherein the at least one wick for drawing molten silicon from said basin to said body has a decreasing cross-sectional configuration along the length thereof.

8. An apparatus according to claim 1 wherein said third temperature is a temperature in the range of 1500°–2000° C.

9. An apparatus according to claim 8 including means in said third chamber for partially cooling said body with an inert gas.

* * * * *